United States Patent Office 3,459,818
Patented Aug. 5, 1969

3,459,818
PROCESS OF PRODUCING TETRAFLUOROETHYLENE AND HEXAFLUOROPROPYLENE
Hiroshi Ukihashi, Tokyo, and Michio Hisasue, Yokohama, Japan, assignors to Asahi Glass Co., Tokyo, Japan, a corporation of Japan
No Drawing. Filed May 22, 1967, Ser. No. 640,348
Claims priority, application Japan, May 28, 1966, 41/32,439
Int. Cl. C07c 21/18, 17/26
U.S. Cl. 260—653.3                     8 Claims

ABSTRACT OF THE DISCLOSURE

Chlorodifluoromethane is partially pyrolyzed in a tube reactor and hydrogen chloride by-product is eliminated, and the resulting mixture of chlorodifluoromethane and more than 10% tetrafluoroethylene is again pyrolyzed in the tube reactor to give a gas mixture consisting principally of tetrafluoroethylene and hexafluoropropylene. Proportions of tetrafluoroethylene and hexafluoropropylene in said gas mixture can be controlled by adjusting the conditions of pyrolysis.

BACKGROUND OF THE INVENTION

Field of the invention

The present invention relates to a process of producing tetrafluoroethylene $C_2F_4$ and hexafluoropropylene $C_3F_6$, and more particularly to a pyrolysis process of simultaneously manufacturing $C_2F_4$ and $C_3F_6$ from chlorodifluoromethane $CHClF_2$ in a desired proportion and moreover with an improved yield.

Description of the prior art

It has hitherto been known to produce tetrafluoroethylene $C_2F_4$ by pyrolysis of chlorodifluoromethane $CHClF_2$ (for instance, U.S. Patent 2,551,533 issued to F. B. Downing, A. F. Benning and F. C. McHarness, May 8, 1951). In that case, it was disclosed that the conversion of $CHClF_2$ (proportion of converted $CHClF_2$ to supplied $CHClF_2$) should be held low for retaining a selectivity of $C_2F_4$ (proportion of produced $C_2F_4$ to converted $CHClF_2$) at a satisfactory value.

Moreover, it has been known for hexafluoropropylene $C_3F_6$ to be produced by the pyrolysis of tetrafluoroethylene $C_2F_4$, in which case a high yield can be obtained only under a certain limited condition (for instance, U.S. Patent 2,758,138 issued to D. A. Nelson, Aug. 7, 1956).

On the other hand, it has also been well known that, in addition to tetrafluoroethylene $C_2F_4$, hexafluoropropylene $C_3F_6$ and perfluorocyclobutane $C_4F_8$ can be obtained at a considerable selectivity by effecting the pyrolysis so that the conversion of chlorodifluoromethane $CHClF_2$ is kept between approximately 86% to 94% (for instance, U.S. Patent 3,306,940 issued to R. H. Halliwell, Feb. 28, 1967). Since $C_3F_6$ is useful as a raw material for polymerization purposes and $C_4F_8$ is useful as an aerosol propellant, the above process for making $C_3F_6$ and $C_4F_8$ is considered to be a very important one. However, according to the process referred to above, it is generally difficult for the sum of the selectivities of $C_2F_4$ and $C_3F_6$ to attain a completely satisfactory value. In particular, when the conversion of $CHClF_2$ exceeds 94%, the quantity of unrecoverable by-product will be increased remarkably and clogging of the reactor due to carbon deposition will take place. Consequently, a disadvantage in such process lies in the fact that the yields of useful $C_2F_4$ and $C_3F_6$ drop below satisfactory values, even taking into consideration the production of the $C_4F_8$.

BRIEF SUMMARY OF THE INVENTION

An object of the present invention is to provide an improved process which makes it possible to produce $C_2F_4$ and $C_3F_6$ by pyrolyzing $CHClF_2$, with a high efficiency at a substantially satisfactory selectivity, in particular at a selectivity above approximately 75%, independently of the conversion of $CHClF_2$.

Another object of the present invention is to provide an improved process, which makes it possible to simultaneously produce $C_2F_4$ and $C_3F_6$ during the pyrolysis of $CHClF_2$ with a high efficiency by optionally changing the production rate for $C_2F_4$ and $C_3F_6$.

A further object of the present invention is to provide an improved pyrolysis process using $CHClF_2$ as a starting material be effected in such a manner that the conversion of $CHClF_2$ is eventually high and the production of less useful fluorinated compounds and unrecoverable by-products is at a minimum.

Other objects and advantageous features of the present invention will become apparent from the following description of the invention.

The object of the present invention will be achieved by an improved new process as follows. Namely, these objects can be achieved by the improved process which comprises pyrolyzing $CHClF_2$ in the presence of $C_2F_4$ to produce $C_2F_4$ and $C_3F_6$, and in other words, pyrolyzing a gas mixture which consists mainly of $CHClF_2$ and $C_2F_4$ and which is substantially devoid of hydrogen chloride, in which mixture the proportion of $C_2F_4$ in the sum of the two components, i.e. $CHCl_2$ and $C_2F_4$, is at least 10 mol percent. In particular embodiments the process of the present invention comprises first partially pyrolyzing $CHClF_2$ chiefly into $C_2F_4$ and hydrogen chloride at 600 to 1000° C. in such a manner that the concentration of $C_2F_4$ will become 10 to 60 mol percent after the hydrogen chloride by-product is eliminated; then substantially eliminating hydrogen chloride from the pyrolysis product; and then pyrolyzing the gas mixture consisting essentially of $CHClF_2$ and $C_2F_4$ thus obtained, the proportion of $C_2F_4$ in the sum of said two component substances being 10 to 60 mol percent, in a reactor, held at 750 to 850° C. in its inlet side extending over more than half of its length and at 850 to 1050° C. in its outlet side extending over the balance of its length, to produce $C_2F_4$ and $C_3F_6$.

The process of the present invention is based on the following discoveries or findings.

In general, it is not desirable to add, initially, a reaction product to reactant raw materials in a chemical reaction from the point of view of both the reaction rate theory and the reaction equilibrium theory. Surprisingly it has now been found in the present invention that in the pyrolysis of a gas mixture of $CHClF_2$ and $C_2F_4$ which is substantially devoid of hydrogen chloride, $CHClF_2$ is ultimately converted into $C_2F_4$ and $C_3F_6$ with a high rate of conversion, thereby enhancing the selectivity of the $C_2F_4$ and the $C_3F_6$ that are produced. The reason therefor is not always clear. However, it is presumably due to the fact that the concentration of hydrogen chloride in the mixture of $CHClF_2$ and $C_2F_4$ being pyrolyzed is relatively low due to the presence of the $C_2F_4$ and the formation of undesirable by-products from the reaction between the hydrogen chloride and $C_2F_4$ that are produced is decreased.

Further, in the present invention, the pyrolysis at a conversion of $CHClF_2$ above 94% does not increase the formation of unrecoverable by-products and less useful fluorinated compounds. The pyrolysis at a conversion of $CHClF_2$ below 86% does not lower the total selectivity of useful products such as $C_2F_4$, $C_3F_6$ and $C_4F_8$. $C_2F_4$ and $C_3F_6$ can always be produced at a total selectivity of $C_2F_4$ and $C_3F_6$ of approximately 75%. Of course, the pyrolysis of $CHClF_2$ at conversions of 86 to 94% can also hold the total selectivity of $C_2F_4$, $C_3F_6$ and $C_4F_8$ high. As described above, according to the process of the present invention, it is possible to produce $C_2F_4$ and $C_3F_6$ with a selectivity which can be used industrially, independently of the conversion of $CHClF_2$. In particular, $C_2F_4$ and $C_3F_6$ can be manufactured at a total selectivity of near 80% while holding the ultimate conversion of $CHClF_2$ at above 95%.

Furthermore, in the process of the present invention, the total selectivity for $C_2F_4$ and $C_3F_6$ is always above 75% at any optional selectivity of the $C_2F_4$ (or any suitable selectivity of the $C_3F_6$). In addition, the total selectivity is hardly affected by the pyrolysis conditions, such as reaction temperature, pyrolysis time or contact time and so forth. Accordingly, $C_2F_4$ and $C_3F_6$ can be produced at a desired selectivity under suitably selected pyrolysis conditions in accordance with the size of the manufacturing plant and the demand for the products while holding the total selectivity for $C_2F_4$ and $C_3F_6$ at a high level of above 75%. On the other hand, the process of the present invention makes it possible to convert $CHClF_2$ at a high rate of conversion in a short pyrolysis time. Consequently, the process of the present invention can enhance the manufacturing capacity of a plant in comparison with conventional processes, and reduce the amount or size of the apparatus necessary for producing the same quantity of product.

DETAILED DESCRIPTION INCLUDING PREFERRED EMBODIMENTS

The gas mixture pyrolyzed in the present invention is mainly composed of $CHClF_2$ and $C_2F_4$, and the proportion of $C_2F_4$ to the sum of the two component substances is at least 10 mol percent or more, and the said gas mixture should be substantially free from hydrogen chloride. Such a gas mixture can be obtained by mixing $CHClF_2$ with $C_2F_4$.

However, as already described, the gas obtained from the preliminary partial pyrolysis of $CHClF_2$ with the attendant removal of the hydrogen chloride by-product is more appropriate for industrial practice. In the latter case, any condition to be adopted for producing $C_2F_4$ can be adopted at the time of the preliminary partial pyrolysis of $CHClF_2$. For instance, $CHClF_2$ may be pyrolyzed at a temperature of approximately 600 to 1000° C., preferably 650 to 900° C. in a tube reactor. However, it is necessary to set the selectivity for the $C_2F_4$ at above 80% in the gas which is produced, and to set the proportion of $C_2F_4$ to the sum of $CHClF_2$ and $C_2F_4$ at from 10 to 60 mol percent. The use of a proportion of $C_2F_4$ of below 10 mol percent will increase the selectivity of the $C_2F_4$ and is thus not desirable. This tendency is particularly pronounced when the temperature is low at the time of the pyrolysis of the gas mixture. It is difficult to initially obtain a gas mixture containing a proportion of $C_2F_4$ of over 60 mol percent by a partial pyrolysis of $CHClF_2$, and moreover, the object of the present invention of simultaneously producing $C_2F_4$ and $C_3F_6$ with a high efficiency in the pyrolysis of a gas mixture comprising $CHClF_2$ and $C_2F_4$ will not be achieved.

In general, the proportion of $C_2F_4$ in the gas mixture obtained by the preliminary pyrolysis is varied by controlling the pyrolysis temperature and pyrolysis time or contact time. For instance, when $CHClF_2$ is pyrolyzed at a pyrolysis temperature of 800° C. and for a pyrolysis time of 0.1 sec., a gas mixture of the composition 67 mol percent $CHClF_2$, 31 mol percent $C_2F_4$ and 2% of other components is obtainable after the hydrogen chloride by-product has been eliminated. The gas produced by such a preliminary partial pyrolysis will become a gas mixture which is usable in the present invention, after removing the hydrogen chloride by-product. Hydrogen chloride can readily be eliminated by well-known means such as by washing with water or an alkaline solution. Since $C_4F_8$ or some of the other fluorine-containing compounds in the gas mixture thus produced change into $C_2F_4$ or $C_3F_6$ by the pyrolysis process of the present invention, these by-products do not have to be separated and removed.

The pyrolysis of the $CHClF_2$ and $C_2F_4$ gas mixture is accomplished at a temperature of 700 to 1100° C. It is particularly appropriate, for enhancing or improving the sum of the selectivities of the $C_2F_4$ and $C_3F_6$, to keep more than half of the pyrolysis reactor, for instance, ⅔ of the reactor, at 750 to 850° C. and to keep the balance of its length, for instance, ⅓, at 850 to 1050° C., and preferably at 900 to 1000° C. Such a temperature gradient during the pyrolysis is especially appropriate in order to enhance the selectivity of the $C_3F_6$. In general, the conversion is enhanced with an increase of the pyrolysis temperature and pyrolysis time, and even at a conversion of over 95% can give satisfactory selectivities for $C_2F_4$ and $C_3F_6$. The sum of the selectivities for the $C_2F_4$ and $C_3F_6$ is not affected too much by the pyrolysis conditions as described before. The selectivity of the $C_2F_6$ is improved by an increase of the pyrolysis temperature and pyrolysis time. In particular, the temperature of the outlet side of the pyrolysis reactor is closely related to the selectivity of the $C_3F_6$ which is enhanced remarkably by a rise in temperature. A pyrolysis temperature below 700° C. lowers the conversion and also makes it difficult to obtain a high selectivity of the $C_3F_6$. On the other hand, a pyrolysis temperature above 1100° C. increases the quantity of less useful fluorinated compounds and unrecoverable by-products and decreases the selectivities of the $C_2F_4$ and $C_3F_6$. Furthermore, the pyrolysis time, namely the residence time of the raw material gas mixture in the pyrolysis reactor is normally selected so as to be 0.005 to 2 sec., particularly 0.03 to 0.20 sec.

A pyrolysis time of below 0.005 sec. decreases the conversion and a pyrolysis time of over 2 sec. increases the quantity of by-products. Further, a reaction pressure, of approximately 0.1 to 2 atmosphere may be used. In order to enhance the selectivities of the $C_2F_4$ and $C_3F_6$, it is preferable to employ low pressures. In some cases, the decrease in the partial pressure of reactant materials due to the addition of a diluent, such as an inert gas, for instance, nitrogen, helium carbon dioxide gas and steam or the like brings about the same effects. Further, $C_4F_8$ which is produced as a by-product in relatively large quantities during the pyrolysis can be recovered as a product by separation procedures. However, the $C_4F_8$ recovered from the pyrolysis product can also be recirculated to the pyrolysis reaction. Thereby, since $C_2F_4$ and $C_3F_6$ are produced by pyrolysis of $C_4F_8$, the selectivities of the $C_2F_4$ and $C_3F_6$ can be further raised.

The pyrolysis process of the present invention is carried out in any suitable pyrolysis apparatus, such as fluidized bed reactors or tube reactors. The process for the present invention is preferably effected by continuously introducing a raw material gas mixture into a tube reactor. The reactor is preferably made of a material sufficiently inert to the reactant materials and reaction products. For instance, the reactor may be appropriately lined with a noble metal such as platinum, but reactors made of silver, carbon, Inconel or the like can also be employed. The process may be carried out batchwise rather than continuously, but a continuous operation is preferred.

The invention is further described in the following examples which are illustrative but not limitative thereof.

In the following examples, two platinum lined tube reactors each made of Inconel having an inner diameter of 8 mm. and an outer diameter of 15 mm. were used. The first tube reactor was used for the preliminary partial pyrolysis of a raw material $CHClF_2$. The second tube reactor was used for pyrolyzing a gas mixture consisting mainly of $CHClF_2$ and $C_2F_4$ which was obtained after substantially removing the hydrogen chloride by product from the pyrolysis product in said first tube reactor. The first and second tube reactors were heated respectively by using 16 KW electric furnaces. The length of the portion of the tube reactor that was heated was approximately 80 cm., 30 cm. of which was the preheating zone and 50 cm. was the pyrolysis zone. The temperature of the tube reactor was measured with a Pt-PtRh thermocouple. The control and recording of the said temperature were performed by connecting said thermocouple with the temperature-controlling device and temperature recording device for the electric furnaces. The control of the pyrolysis time was carried out by adjusting the residence time in the pyrolysis zone of the tube reactor for the $CHClF_2$ or the gas mixture consisting chiefly of $CHClF_2$ and $C_2F_4$, namely, by adjusting the flow rate of said reactants in their respective pyrolysis zones.

The raw material $CHClF_2$ was introduced into the first tube reactor at a predetermined flow rate through a flowmeter. The temperature of the pyrolysis zone the first tube reactor was held at a predetermined temperature. The degree of partial pyrolysis of the $CHClF_2$ was controlled by adjusting the pyrolysis time. The produced gas flowing out of the reactor was rapidly cooled with water in a double tube type cooler made of copper, and then fed into a wash tower made of polyvinyl chloride, wherein the hydrogenchloride by-product was eliminated by washing the gas with water. Subsequently, the gasses flowing out of said tower were fully dried by passing them through a drying tower. The resulting dried gas was partially analyzed by vapor phase chromatography, and then fed into the said second tube reactor.

The gas mixture obtained in the abovementioned manner and consisting mainly of $CHClF_2$ and $C_2F_4$ was introduced into said second tube reactor at a predetermined flow rate through a flowmeter. The temperature of the pyrolysis zone of the second tube reactor was held so that it was kept at 800° C. on its inlet side, i.e. approximately the first ⅔ of its length, while it was kept at various temperatures, as referred to later, for the remainder or approximately ⅓ of its length, which was its outlet side. The pyrolysis time was adjusted by controlling the flow rate of the gas mixture in the pyrolysis zone. The gas pyrolyzed in the second tube reactor was rapidly cooled in the same manner as that described above, and dried after the hydrogen chloride by-product was removed, and thereafter treated in a separating and refining apparatus by a known method. The analysis of the products was conducted on a portion of a dried gas according to vapor phase chromatography. Furthermore, the reaction pressure was 1 atm. unless otherwise indicated.

On the other hand, in Comparative Examples 1 to 4, $CHClF_2$ was directly introduced into the second tube reactor and pyrolyzed therein without effecting its partial pyrolysis in the first tube reactor.

EXAMPLE 1

In a first tube reactor, $CHClF_2$ was pyrolyzed at 700° C. and for 0.3 second of pyrolysis time. The conversion of the $CHClF_2$ was 50%, the composition of the product after elimination of HCl was 65.5 mol percent of $CHClF_2$, 29.9 mol percent of $C_2F_4$, 1.3 mol percent of $C_3F_6$ and 1.3 mol percent of $C_4F_8$.

A gas mixture of such composition was introduced into a second tube reactor at a flow rate of 149.4 l./hour and pyrolyzed therein. The temperature in the outlet side, approximately ⅓, of the second tube reactor was maintained at 900° C. The time of pyrolysis was 0.105 sec. The composition of product from the second tube reactor after elimination of HCl was 18.4 mol percent of $CHClF_2$, 47.3 mol percent of $C_2F_4$, 16.9 mol percent of $C_3F_6$ and 6.0 mol percent of $C_4F_8$.

Consequently the conversion of $CHClF_2$ supplied to the first tube reactor ultimately reached 91.4% and the selectivities calculated for the $C_2F_4$, $C_3F_6$ and $C_4F_8$ were respectively 50.0%, 26.8% and 12.6%.

EXAMPLE 2

$CHClF_2$ was introduced into a first tube reactor and pyrolyzed therein. The temperature of the first tube reactor was 800° C. and the pyrolysis time was 0.18 second. As a result, the conversion of $CHClF_2$ was 66.0% and the composition of the product after elimination of HCl was 57.5 mol percent of $CHClF_2$, 39.8 mol percent of $C_2F_4$, 1.2 mol percent of $C_3F_6$ and 0.7 mol percent of $C_4F_8$.

A gas mixture of such composition was introduced into a second tube reactor at a flow rate of 117.6 l./hour and pyrolyzed therein. The temperature of the outlet side, approximately ⅓, of the second tube reactor was maintained at 900° C. The time of pyrolysis was 0.13 second. The composition of product from the second tube reactor was 10.2 mol percent of $CHClF_2$, 32.6 mol percent of $C_2F_4$, 35.4 mol percent of $C_3F_6$ and 3.4 mol percent of $C_4F_8$.

Consequently, the conversion of $CHClF_2$ supplied to the first tube reactor ultimately reached 95.6% and the selectivities for the $C_2F_4$, $C_3F_6$ and $C_4F_8$ were respectively 30.3%, 49.4% and 6.3%.

EXAMPLE 3

$CHClF_2$ was introduced into a first tube reactor at a flow rate of 175 l./hour and pyrolyzed therein. The reaction temperature was 850° C. As a result, the conversion of $CHClF_2$ was 54.7%, and the composition of the product after removal of HCl was 62.8 mol percent of $CHClF_2$, 35.7 mol percent of $C_2F_4$, 0.5 mol percent of $C_3F_6$ and 0.5 mol percent of $C_4F_8$.

A gas mixture of such composition was introduced into a second tube reactor at a flow rate of 297 l./hour and pyrolyzed therein. The temperature of the second tube reactor was maintained at 950° C. in the outlet side, approximately ⅓, of the second tube reactor. The pyrolysis time was 0.04 second. The composition of product from the second tube reactor was 31.3 mol percent of $CHClF_2$, 41.8 mol percent of $C_2F_4$, 10.5 mol percent of $C_3F_6$ and 1.9 mol percent of $C_4F_8$.

Accordingly, the conversion of $CHClF_2$ supplied to the first tube reactor ultimately reached 84.0%, and the selectivities for the $C_2F_4$, $C_3F_6$ and $C_4F_8$ were 56.7%, 21.6% and 5.2% respectively.

EXAMPLE 4

$CHClF_2$ was introduced into a first tube reactor and pyrolyzed therein. The reaction temperature was 800° C.; the pyrolysis time was approximately 0.1 second. As a result, the conversion of $CHClF_2$ was 51.0% and the composition of product after elimination of HCl was 66.1 mol percent of $CHClF_2$, 32.1 mol percent of $C_2F_4$, 0.6 mol percent of $C_3F_6$, and 0.5 mol percent of $C_4F_8$.

A gas mixture of such composition was introduced into a second tube reactor at a flow rate of 446 l./hour and pyrolyzed therein. The temperature of the second tube reactor was maintained at 950° C. in the outlet side, approximately ⅓, of the second tube reactor. The pyrolysis time was 0.01 second. The composition of product from the second tube reactor was 47.9 mol percent of $CHClF_2$, 39.9 mol percent of $C_2F_4$, 5.5 mol percent of $C_3F_6$, and 1.8 mol percent of $C_4F_8$.

Consequently, the conversion of $CHClF_2$ fed to the first tube reactor reached, ultimately, 71.6%, and the selectivities for the $C_2F_4$, $C_3F_6$ and $C_4F_8$ were 72.0%, 14.7% and 6.6% respectively.

EXAMPLE 5

A gas mixture obtained in a partial pyrolysis in a first tube reactor and having a composition of 80.6 mol Percent of $CHClF_2$, 12.5 mol percent of $C_2F_4$, 2.0 mol percent of $C_3F_6$ and 2.1 mol percent of $C_4F_8$ was introduced into a second tube reactor at a flow rate of 151 l./hour and pyrolyzed therein. The temperature of the second tube reactor was maintained at 900° C. in the outlet side, approximately ⅓, of the second tube reactor. The pyrolysis time was 0.104 second. The composition of the product from the second tube reactor was 18.2 mol percent of $CHClF_2$, 50.1 mol percent of $C_2F_4$, 15.8 mol percent of $C_3F_6$ and 6.3 mol percent of $C_4F_8$.

Consequently, the conversion of $CHClF_2$ fed into the first tube reactor eventually reached 90.7% and the selectivities for the $C_2F_4$, $C_3F_6$ and $C_4F_8$ were respectively 52.8%, 25.0% and 13.2%.

verted $CHClF_2$ to originally supplied $CHClF_2$ (namely, in Examples 8 to 14, the proportion of $CHClF_2$ converted after pyrolysis in the second tube reactor to $CHClF_2$ supplied to the first tube reactor and in Comparative Examples 1 to 4, the proportion of $CHClF_2$ converted after pyrolysis in the second tube reactor to $CHClF_2$ introduced into the second tube reactor). On the other hand, the selectivities for the $C_2F_4$, $C_3F_6$ and $C_4F_8$ are the respective production rates of the $C_2F_4$, $C_3F_6$ and $C_4F_8$ with respect to the $CHClF_2$ converted.

TABLE 1

| Comparative example or Example of embodiments No. | Proportion of $C_2F_4$ (mol percent) | Pyrolysis time in 2nd reactor (sec.) | Temperature in the outlet side of 2nd reactor (° C.) | Pressure in 2nd reactor (atm.) | Conversion of $CHClF_2$ (percent) | Selectivity for products (percent) | | |
|---|---|---|---|---|---|---|---|---|
| | | | | | | $C_2F_4$ | $C_3F_6$ | $C_4F_8$ |
| Comparative example: | | | | | | | | |
| 1 | 0 | 0.015 | 1,000 | 1 | 72.3 | 40.8 | 28.4 | 2.4 |
| 2 | 0 | 0.019 | 1,000 | 1 | 82.5 | 35.7 | 30.1 | 1.5 |
| 3 | 0 | 0.023 | 1,000 | 1 | 90.0 | 30.7 | 31.0 | 2.0 |
| 4 | 0 | 0.026 | 1,000 | 1 | 94.6 | 27.5 | 29.9 | 3.5 |
| Example of embodiments: | | | | | | | | |
| 8 | 25.8 | 0.036 | 950 | 0.5 | 71.3 | 79.3 | 11.0 | 5.0 |
| 9 | 27.8 | 0.01 | 1,000 | 1 | 77.6 | 63.7 | 19.2 | 5.0 |
| 10 | 27.8 | 0.03 | 1,000 | 1 | 89.1 | 41.9 | 38.6 | 4.8 |
| 11 | 36.2 | 0.17 | 900 | 1 | 95.0 | 18.1 | 60.0 | 1.6 |
| 12 | 40.3 | 0.109 | 950 | 0.5 | 96.8 | 29.1 | 54.4 | 1.2 |
| 13 | 45.2 | 0.13 | 900 | 1 | 96.4 | 23.0 | 57.6 | 3.1 |
| 14 | 46.5 | 0.08 | 950 | 1 | 95.8 | 26.6 | 49.2 | 4.3 |

EXAMPLE 6

A gas mixture obtained from the first tube reactor in Example 1 and having a composition of 65.5 mol percent of $CHClF_2$, 29.9 mol percent of $C_2F_4$, 1.3 mol percent of $C_3F_6$ and 1.3 mol percent of $C_4F_9$ was introduced into the second tube reactor at a flow rate of 344 l./hour and pyrolyzed therein. The temperature of the second tube reactor was maintained at 900° C. in the outlet side, approximately ⅓, of the said tube reactor. The pyrolysis time was 0.05 second. Thus, the composition of the product from the second tube reactor was 29.0 mol percent of $CHClF_2$, 50.4 mol percent of $C_2F_4$, 5.9 mol percent of $C_3F_6$ and 3.0 mol percent of $C_4F_8$.

The conversion of $CHClF_2$ supplied to the first tube reactor ultimately reached 80% and the selectivities for the $C_2F_4$, $C_3F_6$ and $C_4F_8$ was respectively 66.0%, 11.5% and 7.9%.

EXAMPLE 7

The gas mixture obtained from a first tube reactor and having the same composition as that in Example 6 was introduced into a second tube reactor at a flow rate of 58.1 l./hour and pyrolyzed therein. The temperature of the second tube reactor was maintained at 900° C. in the outlet side, approximately ⅓, of the said tube reactor. The pressure in the second tube reactor was kept at 0.5 atmospheres. The pyrolysis time was 0.134 second. Thus, the composition of the product from the second tube reactor was 10.2 mol percent of $CHClF_2$, 41.9 mol percent of $C_2F_4$, 30.2 mol percent of $C_3F_6$ and 1.9 mol percent of $C_4F_8$.

The conversion of $CHClF_2$ supplied to the first tube reactor ultimately reached 94.7% and the selectivities for the $C_2F_4$, $C_3F_6$ and $C_4F_8$ were 41.0%, 44.3% and 3.7% respectively.

EXAMPLES 8 TO 14 AND COMPARATIVE EXAMPLES 1 TO 4

In the pyrolysis reactions carried out in the second tube reactor with variations in the pyrolysis time, temperature in the outlet side of pyrolysis zone, reaction pressures and proportion of $C_2F_4$ in the gas mixture introduced, the conversion of $CHClF_2$ and selectivity for each product are as shown in Table 1. Furthermore, the conversion of $CHClF_2$ is the proportion of finally con- In Comparative Examples 1 and 2 wherein $CHClF_2$ is pyrolyzed at a low conversion (below 86%) as in hitherto known processes, the total selectivity for $C_2F_4$ and $C_3F_6$ is below 70%; and the total yield of $C_2F_4$ and $C_3F_6$ is 50% in Comparative Example 1 and 54.3% in Comparative Example 2, and such values are relatively low. In contrast therewith, in Examples 8 and 9 of the present invention wherein $CHClF_2$ is pyrolyzed at a low conversion as in hitherto known processes, the total selectivity is above 75% and the total yield is 64.4% in Example 8 and 64.3% in Example 9, and such values are high.

In the Comparative Example 3 wherein $CHClF_2$ is pyrolyzed according to a process described in the specification of U.S. Patent 3,306,940 (the conversion is 86 to 94%), the total selectivity for $C_2F_4$ and $C_3F_6$ is low and is an insufficient value and the total yield of $C_2F_4$ and $C_3F_6$ is a low value of 55.5%. On the other hand, in Example 10 of the present invention (the conversion is 89.1%), the total selectivity is 80.5% and the total yield is 71.8%. Every one of such latter values is very good.

In Comparative Example 4, wherein $CHClF_2$ is pyrolyzed at a remarkably high conversion (above 94%), the total selectivity is 57.4% and it is extremely low. In contrast thereto, in Examples 11 to 14 of the present invention, the total selectivity is approximately 80% and high, and the total yield is around 75 to 80% and remarkably good.

EXAMPLE 15

$CHClF_2$ was pyrolyzed using an apparatus comprising devices similar to the first and second tube reactors used in Examples 1 t o14. The temperature of the second tube reactor was so maintained as to be 900° C. throughout the whole pyrolysis zone of said reactor, without providing any temperature gradient. A gas mixture containing 35.4 mol percent of $C_2F_4$ was introduced into the second tube reactor at a flow rate of 354 l./hour. The pyrolysis time in the second tube reactor was 0.040 sec., and the reaction pressure was 1 atmosphere.

Consequently, the final conversion of $CHClF_2$ supplied to the first tube reactor was 81.9%; the selectivities of the $C_2F_4$, $C_3F_6$ and $C_4F_8$ with respect to the converted $CHClF_2$ were respectively 67.0%, 13.3% and 8.9%.

EXAMPLE 16

$CHClF_2$ was pyrolyzed using an apparatus comprising first and second tube reactors as in Examples 1 to 14. The temperature of the second tube reactor was maintained at 900° C. throughout the whole pyrolysis zone. $CHClF_2$ was partially pyrolyzed in the first tube reactor, and a gas mixture obtained after substantially eliminating the hydrogen chloride by-product and containing 37.7 mol percent of $C_2F_4$ was introduced into the second tube reactor at a flow rate of 344 l./hour. The pyrolysis time in the second tube reactor was 0.046 second; the reaction pressure was 1 atmosphere.

Consequently, the final conversion of $CHClF_2$ supplied to the first tube reactor was 85.0%; the selectivities for the $C_2F_4$, $C_3F_6$ and $C_4F_8$ with respect to the converted $CHClF_2$ were respectively 66.5%, 11.6% and 7.9%.

EXAMPLE 17

$CHClF_2$ was pyrolyzed using an apparatus comprising first and second tube reactors similar to those used in Examples 1 to 14. The temperature of the second tube reactor was maintained at 800° C. throughout the pyrolysis zone. A gas mixture obtained after substantially removing the hydrogen chloride by-product and containing 24.8 mol percent of $C_2F_4$ was introduced into the second tube reactor at a flow rate of 164.3 l./hour. The pyrolysis time in the second tube reactor was 0.09 second; and the reaction pressure was 1 atmosphere.

Consequently, the final conversion of $CHClF_2$ supplied to the first tube reactor was 77.9% and the selectivities for the $C_2F_4$, $C_3F_6$ and $C_4F_8$ with respect to the converted $CHClF_2$ were respectively 70.1%, 5.0% and 13.4%.

What we claim is:

1. A process for concurrently producing tetrafluoroethylene and hexafluoropropylene which comprises,
    pyrolyzing, in the substantial absence of hydrogen chloride, a gas mixture consisting essentially of 90 to 40 mol percent of chlorodifluoromethane and 10 to 60 mol percent of tetrafluoroethylene for 0.005 to 2 seconds at 700° to 1100° C. in a tube reactor under such conditions that the temperature of more than ½ to about ⅔ of the inlet side of said reactor tube is maintained at 750° to 850° C. and the temperature of the remainder of said reactor tube is maintained at 850° to 1050° C.

2. A process for producing tetrafluoroethylene and hexafluoropropylene as in claim 1, wherein the gas mixture is pyrolyzed for 0.03 to 0.20 second.

3. A process for concurrently producing tetrafluoroethylene and hexafluoropropylene which comprises,
    partially pyrolyzing a quantity of chlorodifluoromethane at a temperature of about 600° to 1000° C. under such conditions as to produce a pyrolysis product comprising unpyrolyzed chlorodifluoromethane, hydrogen chloride and a quantity of tetrafluoroethylene which corresponds to 10 to 60 mol percent of the mols of said unpyrolyzed chlorodifluoromethane and said tetrafluoroethylene,
    substantially removing the hydrogen chloride from said pyrolysis product to form a gas mixture consisting essentially of 10 to 60 mol percent of tetrafluoroethylene and 90 to 40 mol percent of chlorodifluoromethane, and
    pyrolyzing said gas mixture in the substantial absence of hydrogen chloride for 0.005 to 2 seconds at 700° to 1100° C. in a tube reactor under such conditions that the temperature of more than ½ to about ⅔ of the inlet side of said reactor tube is maintained at 750° to 850° C. and the temperature of the remainder of said reactor tube is maintained at 850° to 1050° C.

4. A process for concurrently producing tetrafluoroethylene and hexafluoropropylene which comprises,
    partially pyrolyzing a quantity of chlorodifluoromethane at a temperature of about 600° to 1000° C. under such conditions as to produce a pyrolysis product comprising unpyrolyzed chlorodifluoromethane, hydrogen chloride and a quantity of tetrafluoroethylene which corresponds to 10 to 60 mol percent of the mols of said unpyrolyzed chlorodifluoromethane and said tetrafluoroethylene and to a selectivity of >80 percent with respect to the pyrolyzed quantity of chlorodifluoromethane,
    substantially removing the hydrogen chloride from said pyrolysis product to form a gas mixture consisting essentially of 10 to 60 mol percent of tetrafluoroethylene and 90 to 40 mol percent of chlorodifluoromethane, and
    pyrolyzing said gas mixture in the substantial absence of hydrogen chloride for 0.005 to 2 seconds at 700° to 1100° C. in a tube reactor under such conditions that the temperature of more than ½ to about ⅔ of the inlet side of said reactor tube is maintained at 750° to 850° C. and the temperature of the remainder of said reactor tube is maintained at 850° to 1050° C.

5. A process for producing tetrafluoroethylene and hexafluoroethylene as in claim 1, wherein the temperature of the remainder of the reaction tube is maintained at 900° to 1000° C.

6. A process for producing tetrafluoroethylene and hexafluoropropylene as in claim 1, wherein the pyrolyzing is conducted at a pressure of 0.1 to 2 atmospheres.

7. A process for producing tetrafluoroethylene and hexafluoropropylene as in claim 3 wherein said gas mixture is pyrolyzed for 0.03 to 0.20 second at 0.1 to 2 atmospheres and the temperature of the remainder of the reaction tube is maintained at 900° to 1000° C.

8. A process for producing tetrafluoroethylene and hexafluoropropylene as in claim 4 wherein said gas mixture is pyrolyzed for 0.03 to 0.20 second at 0.1 to 2 atmospheres and the temperature of the remainder of the reaction tube is maintained at 900° to 1000° C.

References Cited

UNITED STATES PATENTS 2,979,539   4/1961   Errede et al. _____ 260—653.3

FOREIGN PATENTS 505,153   8/1954   Canada.
971,995   10/1964   Great Britain.
960,309   6/1964   Great Britain.
297,420   11/1965   Netherlands.

DAVID D. HORWITZ, Primary Examiner

U.S. Cl. X.R.

260—648